US010343666B2

(12) United States Patent
Mannherz et al.

(10) Patent No.: US 10,343,666 B2
(45) Date of Patent: Jul. 9, 2019

(54) METHOD FOR ACTUATING A PARKING BRAKE IN A VEHICLE

(71) Applicant: Robert Bosch GmbH, Stuttgart (DE)

(72) Inventors: Edith Mannherz, Weinsburg (DE); Frank Baehrle-Miller, Schoenaich (DE); Lars Roters, Bietigheim-Bissingen (DE); Matthieu Weinum, Stuttgart (DE); Ullrich Sussek, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/378,735

(22) Filed: Dec. 14, 2016

(65) Prior Publication Data

US 2017/0190329 A1  Jul. 6, 2017

(30) Foreign Application Priority Data

Dec. 22, 2016  (DE) .................. 10 2015 226 838

(51) Int. Cl.
| *B60T 8/32* | (2006.01) |
| *B60T 13/74* | (2006.01) |
| *B60T 7/04* | (2006.01) |
| *B60T 8/92* | (2006.01) |
| *B60T 13/58* | (2006.01) |
| *B60T 17/18* | (2006.01) |

(52) U.S. Cl.
CPC ............ *B60T 13/741* (2013.01); *B60T 7/042* (2013.01); *B60T 8/92* (2013.01); *B60T 13/588* (2013.01); *B60T 17/18* (2013.01); *B60T 8/32* (2013.01); *B60T 2210/12* (2013.01); *B60T 2270/40* (2013.01); *B60T 2270/416* (2013.01)

(58) Field of Classification Search
CPC . B60T 8/171; B60T 7/12; B60T 7/107; B60T 8/17; B60T 11/103; B60T 13/741
USPC ............... 188/2 D, 156–164; 701/70–72
See application file for complete search history.

(56) References Cited

U.S. PATENT DOCUMENTS

| 5,170,343 | A  * | 12/1992 | Matsuda ............ B60G 17/0185 700/79 |
| 7,341,319 | B2 * | 3/2008 | Klusemann ............. B60T 7/085 303/20 |
| 8,532,902 | B2 * | 9/2013 | Bentner ................. B60T 7/042 701/29.2 |
| 8,996,270 | B2 * | 3/2015 | Bieltz ................... B60T 13/746 188/156 |
| 9,221,446 | B2 * | 12/2015 | Kinder .................... B60T 7/042 |
| 2005/0258682 | A1 * | 11/2005 | Halasy-Wimmer ..... F16D 65/18 303/89 |
| 2008/0071455 | A1 * | 3/2008 | Shiraki ............... B60L 15/2018 701/70 |

(Continued)

FOREIGN PATENT DOCUMENTS

DE  103 61 042 B3  5/2005

*Primary Examiner* — Christopher P Schwartz
(74) *Attorney, Agent, or Firm* — Maginot, Moore & Beck LLP

(57) ABSTRACT

A method of actuating a parking brake for a vehicle having an electromechanical brake device in a situation whereat driving dynamics state information is not available in the vehicle and whereat a driver operates the parking brake includes producing an electromechanical braking force with a magnitude that is less than a maximum braking force of the parking brake.

11 Claims, 3 Drawing Sheets

(56) References Cited

U.S. PATENT DOCUMENTS

| | | | |
|---|---|---|---|
| 2008/0283345 A1* | 11/2008 | Balz | F16D 65/18 |
| | | | 188/72.6 |
| 2010/0294602 A1* | 11/2010 | Gustafsson | B60T 13/746 |
| | | | 188/158 |
| 2011/0278105 A1* | 11/2011 | Maron | B60T 13/588 |
| | | | 188/72.1 |
| 2014/0058642 A1* | 2/2014 | Bieltz | B60T 13/746 |
| | | | 701/70 |
| 2015/0061365 A1* | 3/2015 | Sakashita | B60T 7/042 |
| | | | 303/15 |

* cited by examiner

METHOD FOR ACTUATING A PARKING BRAKE IN A VEHICLE

This application claims priority under 35 U.S.C. § 119 to patent application no. DE 10 2015 226 838.1, filed on Dec. 30, 2015 in Germany, the disclosure of which is incorporated herein by reference in its entirety.

The disclosure concerns a method for actuating a parking brake in a vehicle.

BACKGROUND

Parking brakes in vehicles are known that are implemented as electromechanical brake devices with an electrical brake motor that displaces a brake piston towards a brake disk in order to hold the vehicle at a standstill. One such parking brake is known from DE 103 61 042 for example B3.

SUMMARY

The method according to the disclosure concerns a parking brake in a vehicle that is in the form of an electromechanical brake device and comprises an electrical brake motor, by means of which a clamping force holding the vehicle at a standstill can be generated. Here the rotational displacement of the rotor of the electrical brake motor is transferred into the axial control motion of a spindle, by means of which a brake piston supporting a brake lining is pressed axially against a brake disk.

The electromechanical parking brake is preferably integrated within a wheel brake device that is part of the hydraulic vehicle brake, by means of which the vehicle is braked in the braking mode. The hydraulic fluid of the hydraulic vehicle brake acts on the same brake piston as the electromechanical brake device.

With the electromechanical brake device, the vehicle can be braked both when at a standstill and also when travelling. For this purpose, the electromechanical brake device is operated by the driver, for example by means of a suitable button, whereupon the electrical brake motor of the brake device displaces the brake piston against the brake disk. With the method according to the disclosure, the braking is carried out by means of the electromechanical brake device in the case in which driving dynamics state information is not available in the vehicle to one or more regulating systems in the vehicle that influence the driving dynamics state. This is for example the case if a sensor in the vehicle fails, the information transfer from the sensor to an analysis unit or the analysis of the sensor information is defective or inadequate. Accordingly, driver assistance systems that affect the driving dynamics state of the vehicle are also adversely affected, for example anti-lock braking systems (ABS) or electronic stability programs (ESP). In these cases, if the driver operates the parking brake, a braking force is generated by means of the electromechanical brake device.

The magnitude of the electromechanical braking force that is produced by means of the electromechanical brake device lies below the maximum braking force, i.e. the maximum that can be generated with the electromechanical brake device. This ensures that locking of the wheels of the vehicle cannot occur with the use of the braking effect of the electromechanical brake device.

The method according to the disclosure thus enables braking force to be produced by means of the electromechanical brake device if one or more sensor signals that contain information regarding the driving dynamics state of the vehicle fails or cannot be processed. The driving dynamics state information is for example a speed magnitude of the vehicle, for example one or more wheel revolution rates or the speed at the center of gravity of the vehicle. In addition or alternatively, the missing driving dynamics state information can for example also concern an acceleration magnitude in the longitudinal, lateral and/or vertical direction of the vehicle and/or the yaw rate.

According to a preferred implementation, the provision of the electromechanical braking force is carried out independently of the operation of the hydraulic vehicle brake by the driver or by means of a hydraulic actuator that can build up brake pressure independently of the driver, for example by means of a driver assistance system, such as for example the hydraulic pump of an electronic stability program ESP. This enables the electromechanical braking force to be applied in addition to the operation of the hydraulic vehicle brake if the driver operates the corresponding button. It is however also possible to produce the electromechanical braking force if the hydraulic vehicle brake is not operated.

According to a further implementation, while travelling electromechanical braking force can only be produced if one or more regulating systems in the vehicle or driver assistance systems fails or is limited in the functionality thereof owing to the fact that driving dynamics state information is not available in the vehicle. In this case, braking the vehicle by means of the electromechanical brake device is also allowed and enabled while travelling.

According to an advantageous implementation, the electromechanical braking force is raised from the initial level that is available from the electromechanical brake device at the start of the method according to the disclosure to an increased final level. Said final level can be the maximum braking force that can be provided by the electromechanical brake device at its maximum. It is however also possible that the final level lies below the maximum braking force, but is higher than the initial level of the electromechanical braking force.

The initial level of the electromechanical braking force is in particular low enough to avoid locking of the wheels at high coefficients of friction between the wheels and the road—in dry road conditions. Should the wheels lock nevertheless, in particular at a low coefficient of friction, then further locking of the wheels can be inhibited by manually releasing the electromechanical brake device by the driver or automatically by means of a control intervention into the brake device.

According to a further advantageous implementation, increasing the electromechanical braking force, starting from the initial level to the final level, is carried out in stages, which are maintained in particular for a defined period of time and at a defined level, for example for a period of 3 seconds to 6 seconds. For example, three stages can be selected that adopt the electromechanical braking force, so that there is still an intermediate level between the initial level and the final level. For example, the initial level is set at a deceleration of 1.5 m/s², the intermediate level at 2 to 2.5 m/s² and the final level to the maximum braking force, at which the deceleration is for example 3 m/s².

In an alternative implementation, it is also possible to continuously increase the braking force or to increase it in one or more ramps.

According to yet another advantageous implementation, in defined conditions the electromechanical braking force is automatically maintained in the case in which the driver is no longer operating the parking brake. This is for example the case if a defined braking force level has been reached in the electromechanical brake device, for example the maximum braking force. In addition or alternatively, the automatic holding of the electromechanical braking force can also be coupled to a further criterion, for example the speed of the vehicle, wherein in particular the braking force is automatically maintained in the case in which the speed of the vehicle is zero and the vehicle is thus at a standstill. Advantageously, the defined braking force level must be held for a minimum period of for example 3 seconds before said braking force continues to be maintained automatically without operation by the driver.

The individual steps of the method run in a regulation or control unit, in which control signals for actuating the electromechanical brake device are produced. The electromechanical brake device may be part of a brake system that also contains the hydraulic vehicle brake, the components of which are also actuated by means of control signals of the regulation or control unit. In general, the electromechanical brake device and a hydraulic actuator can work together and both can apply the same brake piston to the brake disk.

The actuation of the parking brake can be carried out by means of the software that is associated with a hydraulic actuator. The software runs for example in the regulation or control unit that is directly associated with the electromechanical brake device. It is however also possible to actuate the electromechanical brake device by means of the software of the ESP controller.

BRIEF DESCRIPTION OF THE DRAWINGS

Further advantages and advantageous implementations can be found in the claims, the description of the figures and the illustrations. In the figures:

In the figures, the same components are provided with the same reference characters.

DETAILED DESCRIPTION

Figure 1:
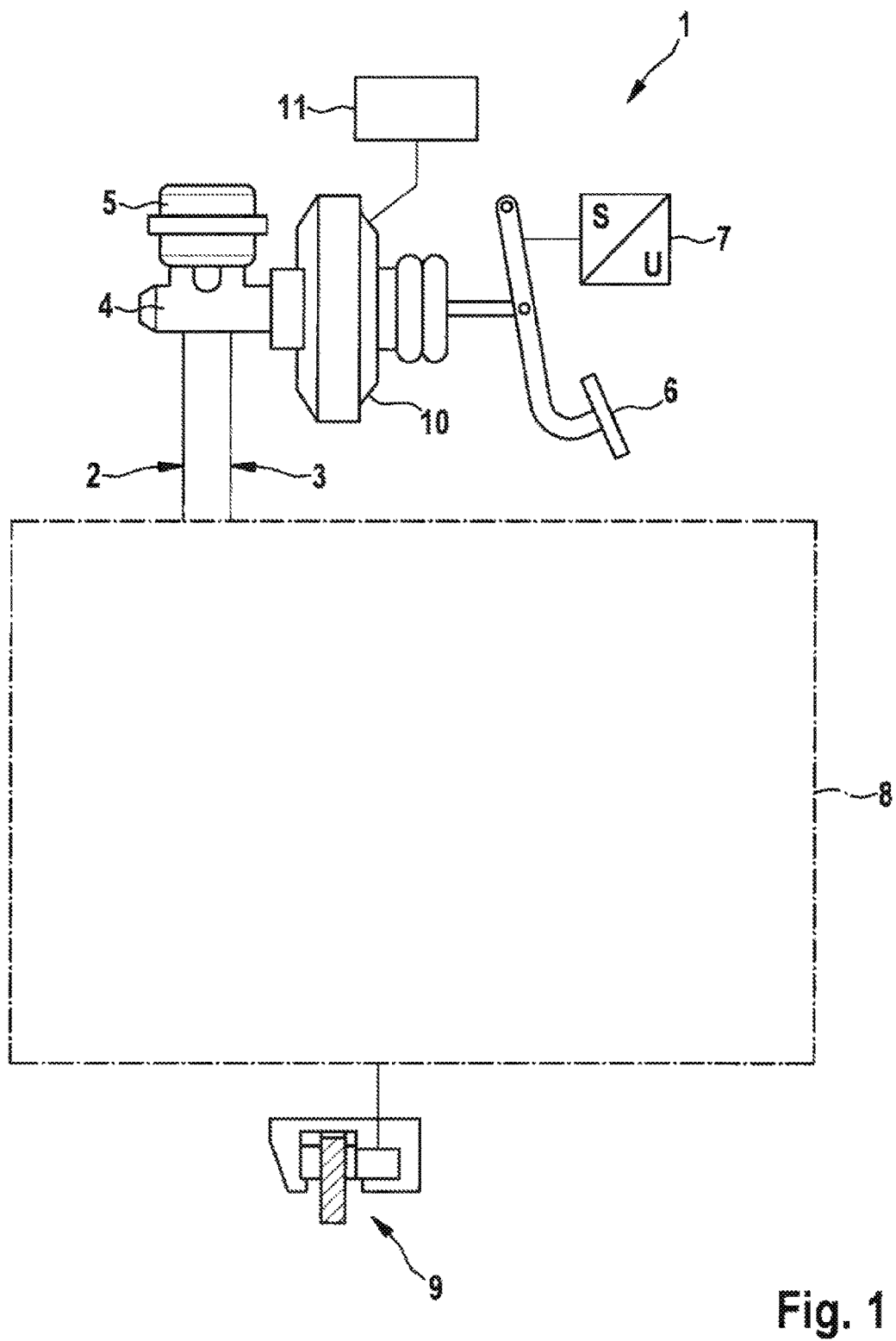
FIG. 1 shows a schematic representation of a with a hydraulic vehicle brake with a braking force booster, wherein the wheel brake devices of the vehicle brake on the rear axle of the vehicle are additionally implemented as an electromechanical brake device with an electrical brake motor.

The hydraulic vehicle brake 1 for a vehicle represented in FIG. 1 comprises a front axle brake circuit 2 and a rear axle brake circuit 3 for supplying and actuating wheel brake devices 9 on each wheel of the vehicle with a brake fluid under hydraulic pressure. The two brake circuits 2, 3 are connected to a common master brake cylinder 4 that is supplied with brake fluid by means of a brake fluid reservoir container 5. The master brake cylinder piston within the master brake cylinder 4 is operated by the driver by means of the brake pedal 6, the pedal travel exerted by the driver being measured by means of a pedal travel sensor 7. A braking force booster 10, which for example comprises an electric motor and which preferably operates the master brake cylinder 4 by means of a gearbox (iBooster), is disposed between the brake pedal 6 and the master brake cylinder 4.

The control motion of the brake pedal 6 measured by the pedal travel sensor 7 is transmitted as a sensor signal to a regulation or control unit 11, in which control signals for actuating the braking force booster 10 are produced. Supplying the wheel brake devices 9 with brake fluid is carried out in each brake circuit 2, 3 by means of different switching valves, which in common with further assemblies are part of brake hydraulics 8. The brake hydraulics 8 further comprise a hydraulic pump that is a component of an electronic stability program (ESP).

Figure 2:
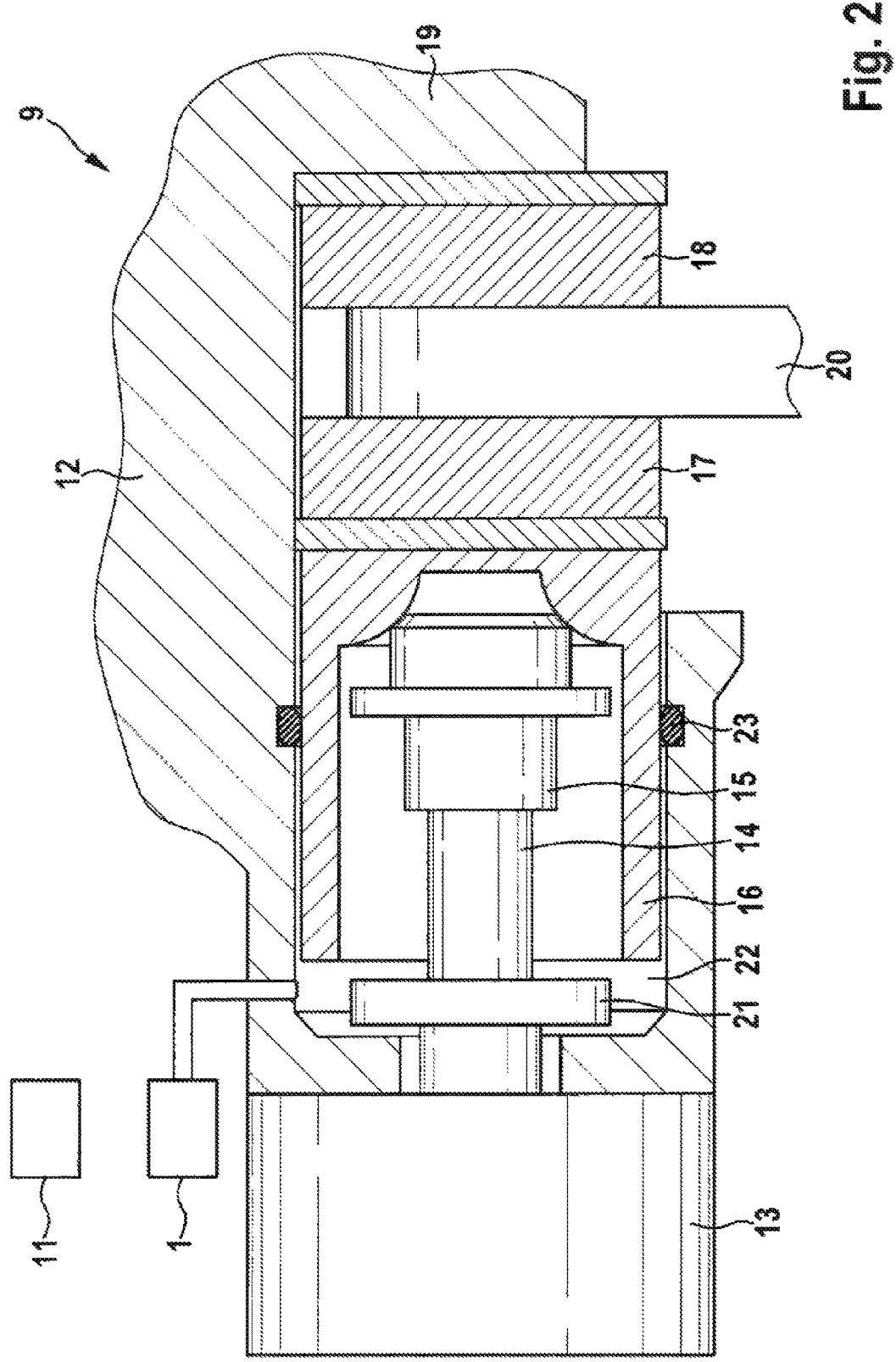
FIG. 2 shows a section through an electromechanical brake device with an electrical brake motor.

In FIG. 2 the wheel brake device 9, which is disposed on a wheel on the rear axle of the vehicle, is illustrated in detail. The wheel brake device 9 is part of the hydraulic vehicle brake 1 and is supplied with brake fluid 22 from the rear axle brake circuit. The wheel brake device 9 comprises, moreover, an electromechanical brake device that is preferably used to hold a vehicle at a standstill, but can also be used to brake the vehicle while the vehicle is moving, in particular at low vehicle speeds below a speed threshold value.

The electromechanical brake device comprises a brake caliper 12 with a claw 19 that overlaps a brake disk 20. The brake device comprises a direct current electric motor as a brake motor 13 forming the control element, the rotor shaft of which drives a spindle 14 to rotate, on which a spindle nut 15 is rotatably supported. During rotation of the spindle 14, the spindle nut 15 is displaced axially. The spindle nut 15 moves within a brake piston 16 carrying a brake lining 17 that is pressed against the brake disk 20 by the brake piston 16. On the opposite side of the brake disk 20 there is a further brake lining 18 that is held in a fixed position on the claw 19. The brake piston 16 is sealed flow-tight on the outside thereof against the accommodating housing by means of a sealing ring 23 engaging around the piston.

Within the brake piston 16, the spindle nut 15 can move axially forwards towards the brake disk 20 during the rotation of the spindle 14 or can move axially rearwards until it reaches a stop 21 during an opposite rotation of the spindle 14. To produce a clamping force, the spindle nut 15 acts on the inner end face of the brake piston 16, whereby the brake piston 16, which is axially movably supported in the brake device, is pressed with the brake lining 17 against the facing end face of the brake disk 20.

For the hydraulic braking force, the hydraulic pressure of the brake fluid 22 from the hydraulic vehicle brake 1 acts on the brake piston 16. The hydraulic pressure can also be effectively boosted when the vehicle is at a standstill by operating the electromechanical brake device, so that the total braking force is composed of the component provided by the electric motor and the hydraulic component. While the vehicle is travelling, either only the hydraulic vehicle brake is active or both the hydraulic vehicle brake and also the electromechanical brake device are active or only the electromechanical brake device is active to produce braking force. The control signals for actuating both the adjustable components of the hydraulic vehicle brake 1 and also the electromechanical wheel brake device 9 are produced in the regulation or control unit 11.

Figure 3:
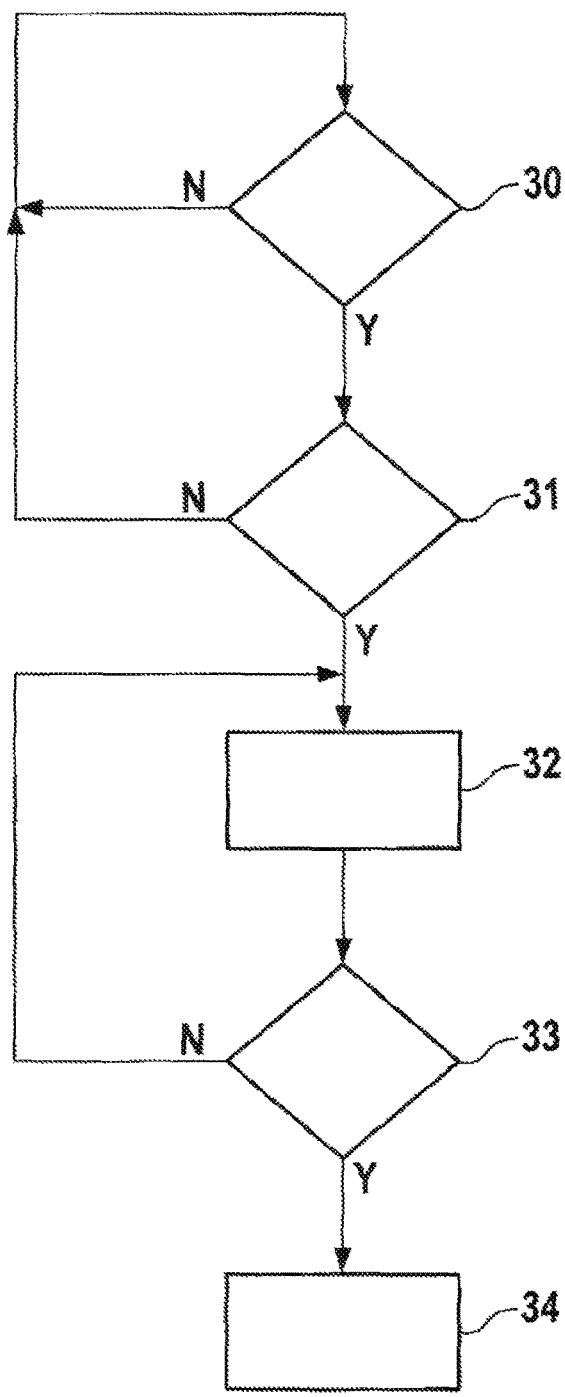
FIG. 3 shows a flow chart with the steps of the method for actuating the electromechanical brake device in the absence of speed information.

FIG. 3 shows a flow chart for actuating the parking brake in the case in which a driving dynamics state variable fails and the driver operates the parking brake manually. First, a check is made in a first step of the method 30 as to whether a driving dynamics state variable, in particular a speed signal, has failed. The failure can concern a sensor, the data transmission from the sensor to the regulation or control unit or a failure in the control unit.

If the query in step 30 shows that there is a corresponding failure of a sensor signal for the driving dynamics state variable, the Yes branch ("Y") subsequently advances to the next step of the method 31. Otherwise, there is no failure and the No branch ("N") subsequently returns back to the start of the method and the query runs again at regular intervals according to step 30.

In step 31 a check is made as to whether the driver operates the electromechanical brake device by means of an associated button. If this is not the case, the No branch subsequently returns back to the start of the method at step 30. If, however, the query in step 31 reveals that the driver has triggered the electromechanical brake device by the operation of a button, the Yes branch subsequently advances to the next step 32, in which the electromechanical brake device is started by the operation of the brake motor, so that a braking force is produced by means of the brake device in an electromechanical manner.

The electromechanical braking force is increased in several stages starting from an initial level until reaching a final level. The braking force preferably adopts three different levels, wherein the initial level is low enough to avoid locking of the wheels at high coefficients of friction between the vehicle and road. If, however, locking of the wheels should occur at a low friction level despite the relatively low braking force of the electromechanical brake device, generation of the braking force can be stopped manually by the driver no longer operating the associated button.

The initial level of the braking force lies for example at an average deceleration of 1.5 m/s$^2$. The initial level is maintained for a defined period of time, which is for example 1.5 to 6 seconds.

The average braking force level produces for example a deceleration of the order of magnitude of 2 to 2.5 m/s$^2$ and can also be provided for a defined period of time, which is either the same length as the period of time of the initial level or may differ therefrom. At the final level, which constitutes the third level stage, the maximum braking force is preferably set that can be produced by the electromechanical brake device at its maximum.

In the following step 33 a query is made as to whether the maximum braking force is maintained for a minimum period of time. If this is the case, it can be assumed that the vehicle is at a standstill and that the driver wants the electromechanical brake device to be used as a parking brake for permanently holding the vehicle. In this case, the Yes branch subsequently advances to the next step 34 and the electromechanical brake device is locked in order to permanently maintain the braking force level that has been reached. Otherwise, the No branch subsequently returns back to step 32 and the step-wise increase of the electromechanical braking force continues.

What is claimed is:

1. A method of actuating a parking brake of a vehicle, comprising:
   in response to a driver operating a parking brake of a vehicle when driving dynamics state information is not available in the vehicle, producing a braking force having an initial magnitude via an electromechanical brake device of the parking brake that has an electrical brake motor configured to displace a brake piston toward a brake disk, the initial magnitude being less than a maximum braking force magnitude of the parking brake;
   increasing the braking force from the initial magnitude; and
   in response to the driver ceasing operation of the parking brake, maintaining the braking force at a first magnitude of the braking force that is less than the maximum braking force magnitude of the electromechanical brake device,
   wherein the method is performed without reference to an acceleration magnitude of the vehicle.

2. The method of claim 1, wherein the increasing of the braking force includes increasing the braking force in stages.

3. The method of claim 2, wherein at least one of the stages of increasing the braking force is maintained for a predetermined period of time and at a predetermined level.

4. The method of claim 1, wherein the producing is further in response to a case in which the vehicle is travelling.

5. The method of claim 1, wherein the driving dynamics state information not available in the vehicle includes a speed magnitude of the vehicle.

6. The method of claim 1, wherein the maintaining of the braking force is carried out in further response to the first magnitude of the braking force being held for a predetermined minimum time period.

7. The method of claim 1, wherein the maintaining of the braking force is carried out in further response to the vehicle being at a standstill.

8. A parking brake for a vehicle, comprising:
   a brake piston;
   a brake disk;
   an electrical brake motor configured to displace the brake piston toward the brake disk; and
   a regulating or control unit configured to actuate the parking brake, the regulating or control unit configured to, without reference to an acceleration magnitude of the vehicle, operate the parking brake to:
      in response to a driver operating the parking brake when driving dynamics state information is not available in the vehicle, produce a braking force having an initial magnitude that is less than a maximum braking force magnitude of the parking brake;
      increasing the braking force from the initial magnitude; and
      in response to the driver ceasing operation of the parking brake, maintaining the braking force at a first magnitude of the braking force that is less than the maximum braking force magnitude of the electromechanical brake device.

9. The method of claim 1, wherein the method is performed when the acceleration magnitude is not available to a regulating or control unit of the vehicle.

10. The method of claim 1, wherein producing the electromechanical force is carried out by the electromechanical brake device and a hydraulic vehicle brake.

11. A method of actuating a parking brake of a vehicle, comprising:
    in response to a driver operating a parking brake of a vehicle when driving dynamics state information is not available in the vehicle, producing a braking force having an initial magnitude via an electromechanical brake device of the parking brake that has an electrical brake motor configured to displace a brake piston toward a brake disk, the initial magnitude being less than a maximum braking force magnitude of the parking brake;
    increasing the braking force from the initial magnitude; and
    in response to the driver ceasing operation of the parking brake, maintaining the braking force at a first magnitude of the braking force that is less than the maximum braking force magnitude of the electromechanical brake device,
    wherein the method is performed without reference to an acceleration magnitude of the vehicle, and wherein the first magnitude of the braking force is equal to the braking force when the driver ceases operating the parking brake.

* * * * *

UNITED STATES PATENT AND TRADEMARK OFFICE
CERTIFICATE OF CORRECTION

PATENT NO. : 10,343,666 B2  
APPLICATION NO. : 15/378735  
DATED : July 9, 2019  
INVENTOR(S) : Mannherz et al.

Page 1 of 1

It is certified that error appears in the above-identified patent and that said Letters Patent is hereby corrected as shown below:

On the Title Page

Item (30), Foreign Application Priority Data "Dec. 22, 2016" should be replaced with --Dec. 30, 2015--

Signed and Sealed this
First Day of October, 2019

Andrei Iancu
*Director of the United States Patent and Trademark Office*